United States Patent
Taguchi (10) Patent No.: US 10,549,668 B2
(45) Date of Patent: Feb. 4, 2020

(54) VEHICLE SEAT

(71) Applicant: TACHI-S CO., LTD., Akishima-shi, Tokyo (JP)

(72) Inventor: Masayuki Taguchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/791,621

(22) Filed: Oct. 24, 2017

(65) Prior Publication Data

US 2018/0111519 A1    Apr. 26, 2018

(30) Foreign Application Priority Data

Oct. 26, 2016  (JP) ................................ 2016-209382

(51) Int. Cl.
| | |
|---|---|
| *B60N 2/90* | (2018.01) |
| *B60N 2/60* | (2006.01) |
| *B60N 2/02* | (2006.01) |
| *B60N 2/30* | (2006.01) |
| *B60N 2/22* | (2006.01) |
| *B60N 2/06* | (2006.01) |
| *B60N 2/80* | (2018.01) |
| *B60N 2/75* | (2018.01) |

(52) U.S. Cl.
CPC ............... *B60N 2/919* (2018.02); *B60N 2/02* (2013.01); *B60N 2/6009* (2013.01); *B60N 2/06* (2013.01); *B60N 2/22* (2013.01); *B60N 2/3011* (2013.01); *B60N 2/3045* (2013.01); *B60N 2/75* (2018.02); *B60N 2/80* (2018.02)

(58) Field of Classification Search
CPC ........ B60N 2/919; B60N 2/6009; B60N 2/02; B60N 2/3045; B60N 2/80; B60N 2/75; B60N 2/06; B60N 2/22; B60N 2/3011
USPC ........... 297/1, 16.1, 118, 183.1, 183.2, 217.1
See application file for complete search history.

(56) References Cited

U.S. PATENT DOCUMENTS

2007/0158989 A1* 7/2007 Ishizuka ................ B60N 2/206
                                                       297/378.1

FOREIGN PATENT DOCUMENTS

JP          2004-249800 A          9/2004

* cited by examiner

*Primary Examiner* — Justin V Lewis
(74) *Attorney, Agent, or Firm* — Westerman, Hattori, Daniels & Adrian, LLP (57) ABSTRACT

A vehicle seat that ensures improving operability of a manipulating member. A supporting member includes a first supporting portion and a second supporting portion disposed at a predetermined interval. A strap is bridged between the first supporting portion and the second supporting portion. A seat back has a recess. A space is formed between the strap (a part bridged between the first supporting portion and the second supporting portion). The part of the strap bridged between the first supporting portion and the second supporting portion are manipulated in a direction entering into the recess or in a direction separating from the recess such that a wire cable is drawn. This allows easily drawing the wire cable using the space of the recess when the strap is manipulated. Accordingly, operability of the strap is improved.

11 Claims, 6 Drawing Sheets

VEHICLE SEAT

TECHNICAL FIELD

The present invention relates to a vehicle seat and especially relates to a vehicle seat that can improve operability of a manipulating member.

BACKGROUND ART

There has been known the following vehicle seat. A manipulating member is coupled to a fixing mechanism to fix a posture of a movable member (for example, a seat back and an arm rest) of the vehicle seat via a wire cable. Drawing the wire cable by the manipulating member releases the fixed state (the fixation by the fixing mechanism) of the posture of the movable member. For example, Patent Literature 1 discloses a vehicle seat in which a strip-shaped manipulating member 3 is disposed to extend between a pair of opposed through-holes 21 and 22 formed on a back surface of a seat back S2. With this vehicle seat, extracting the strip-shaped manipulating member 3 from the pair of through-holes 21 and 22 draws a manipulating wire 63, ensuring releasing a fixed state of a posture of the seat back S2.

CITATION LIST

Patent Literature

[Patent Literature 1] JP-A No. 2004-249800 (for example, paragraph 0012, FIGS. 1 and 2)

SUMMARY OF INVENTION

Technical Problem

However, since the above-described conventional technique includes the manipulating member along a back surface of a movable member, the manipulating member is in close contact with the back surface of the movable member. This causes a problem of deteriorating operability of the manipulating member.

The present invention has been made to address the above-described problem, and the object is to provide a vehicle seat that can improve operability of a manipulating member.

[Solution to Problem and Advantageous Effects of Invention]

According to the vehicle seat according to a first aspect, the vehicle seat includes a first supporting member and a second supporting member disposed at a predetermined interval. The manipulating member is bridged between the first supporting member and the second supporting member. The movable member has a recess. The recess forms a space with a part of the manipulating member bridged between the first supporting member and the second supporting member. The part of the manipulating member bridged between the first supporting member and the second supporting member is manipulated in a direction entering into the recess or in a direction separating from the recess such that the wire cable is drawn. This allows a finger to be passed through the space of the recess to easily manipulate (pull) the manipulating member. Pushing the manipulating member into the space side of the recess also allows drawing the wire cable. This brings an effect of improvement in operability of the manipulating member.

According to the vehicle seat according to a second aspect, in addition to the effect brought by the vehicle seat according to the first aspect, the vehicle seat includes a cover member that coats an opening of the recess. Therefore, the opening of the recess can be less likely to be visually perceived. Accordingly, this provides an effect of improvement in appearance of the vehicle seat.

According to the vehicle seat according to a third aspect, in addition to the effect brought by the vehicle seat according to the second aspect, the following effect is provided. The cover member includes a first insertion hole formed as a hole positioned on the first supporting member side and a second insertion hole formed as a hole positioned on the second supporting member side. The part of the manipulating member bridged between the first supporting member and the second supporting member is inserted through the respective first insertion hole and second insertion hole. This brings an effect that, if the joining between the first supporting member and the second supporting member to the cover member is disengaged, the manipulating member can restrict a coming off of the cover member from the first supporting member and the second supporting member.

According to the vehicle seat according to a fourth aspect, in addition to the effect brought by the vehicle seat according to the first aspect, the following effect is provided. The manipulating member is formed into an endless shape. The first supporting member and the second supporting member are disposed on an inner peripheral side of the endless-shaped manipulating member. A part of the manipulating member in a circumferential circumstantial direction is coupled to the wire cable. Accordingly, when the manipulating member is manipulated in the direction entering into or in the direction separating from the recess of the movable member, the wire cable is drawn by both the manipulating member positioned between the first supporting member and the wire cable and the manipulating member positioned between the second supporting member and the wire cable. This allows efficiently transmitting a tractive force by the manipulation of the manipulating member to the wire cable, bringing an effect of improvement in operability of the manipulating member.

According to the vehicle seat according to a fifth aspect, in addition to the effect brought by the vehicle seat according to the fourth aspect, the following effect is provided. The vehicle seat further includes an outer member through which the wire cable is inserted and a holding member that holds a distal end side of the outer member. The holding member includes a through-hole through which the outer member is inserted and a communication passage that communicates between the through-hole and an outer edge of the holding member. The communication passage is formed with a width with which the outer member is insertable. Since one side of each of the first supporting member and the second supporting member are formed so as to be open, the endless-shaped manipulating member can be bridged between the first supporting member and the second supporting member while the outer member is inserted from the communication passage and disposed at the through-hole of the holding member. This brings an effect of improvement in working efficiency of work to mount the endless-shaped manipulating member and the outer member.

According to the vehicle seat according to a sixth aspect, in addition to the effect brought by the vehicle seat according to the fifth aspect, the communication passage communicates between an outer edge on one side of the holding member and the through-hole along an extension direction of the first supporting member and the second supporting member. This allows mounting the manipulating member to the first supporting member and the second supporting member and mounting the outer member to the through-hole in the identical direction. This brings an effect of improvement in working efficiency of work to mount the endless-shaped manipulating member and the outer member.

According to the vehicle seat according to a seventh aspect, in addition to the effect brought by the vehicle seat according to the second aspect, the following effect is provided. The vehicle seat further includes an outer member through which the wire cable is inserted and a holding member that holds a distal end side of the outer member. The manipulating member has one end coupled to the first supporting member or the holding member. The manipulating member has another end coupled to another end of the wire cable. The one end to the other end of the manipulating member is bridged between the first supporting member and the second supporting member. Accordingly, when the manipulating member is manipulated in the direction entering into or in the direction separating from the recess of the movable member, the wire cable is drawn by the manipulating member positioned between the second supporting member and the wire cable.

In this case, the holding member holds the distal end side of the outer member at a position biased to the second supporting member side of the holding portion in a direction in which the first supporting member is opposed to the second supporting member. This allows efficiently transmitting a tractive force by the manipulation of the manipulating member to the wire cable, bringing an effect of improvement in operability of the manipulating member.

According to the vehicle seat according to an eight aspect, in addition to the effect brought by the vehicle seat according to the seventh aspect, the following effect is provided. The cover member includes a first bottom surface and a second bottom surface. The first bottom surface is formed on the first supporting member side. The first bottom surface is opposed to the manipulating member. The second bottom surface has an opposed interval with the manipulating member formed larger than an opposed interval of the first bottom surface with the manipulating member. The second bottom surface is formed on the second supporting member side. This allows a seated person to manipulate the second supporting member side part of the manipulating member bridged between the first supporting member and the second supporting member.

That is, with the configuration where the one end of the manipulating member is coupled to the first supporting member or the holding member, the manipulation of the second supporting member side part is likely to transmit the tractive force to the wire cable compared with the manipulation of the first supporting member side part of the manipulating member. Since the manipulation of the second supporting member side part of the manipulating member ensures efficiently transmitting the tractive force by the manipulation of the manipulating member to the wire cable, this brings the effect of improvement in the operability of the manipulating member.

According to the vehicle seat according to a ninth aspect, in addition to the effect brought by the vehicle seat according to the seventh aspect, the one end of the manipulating member is coupled to the first supporting member. Therefore, compared with the case where the manipulating member is coupled to the holding member, a dimension of the manipulating member can be shortened. This brings an effect of ensuring reducing a product cost of the vehicle seat.

According to the vehicle seat according to a tenth aspect, in addition to the effect brought by the vehicle seat according to the third aspect, the following effect is provided. When the manipulating member (the part bridged between the first supporting member and the second supporting member) is manipulated in the direction separating from the recess, the first insertion hole and the second insertion hole are formed so as to open with a dimension with which the manipulating member becomes contactless. Accordingly, an interference to the cover member by the manipulating member can be reduced, thereby ensuring reducing a lift of the cover member upward when the manipulating member is manipulated. This brings an effect of ensuring reducing an application of a force in a direction of stripping the cover member from the movable member.

According to the vehicle seat according to an eleventh aspect, in addition to the effect brought by the vehicle seat according to the first aspect, the first supporting member and the second supporting member include depressed portions. The depressed portions are depressed on top surfaces or side surfaces of the first supporting member and the second supporting member. The manipulating member is positioned by the depressed portions. Accordingly, the manipulating member can be engaged with the depressed portions. This brings an effect of improvement in working efficiency of work to mount the manipulating member to the first supporting member and the second supporting member.

DESCRIPTION OF EMBODIMENTS

Figure 1A:
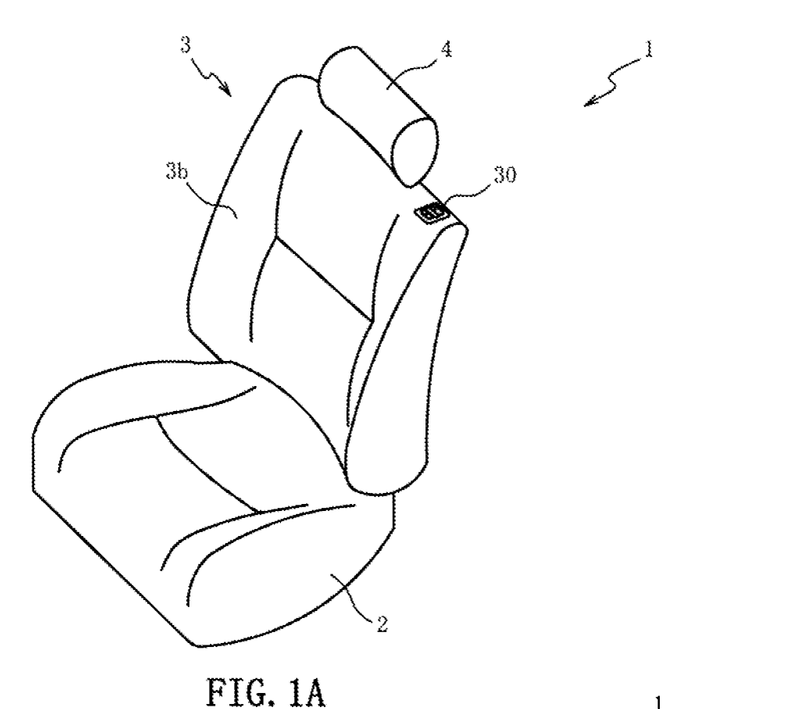
FIG. 1A is a perspective view of a vehicle seat of a first embodiment of the present invention.

The following describes preferred embodiments according to the present invention with reference to the attached drawings. First, the following describes an overall configuration of a vehicle seat 1 with reference to FIG. 1. FIG. 1A is a perspective view of the vehicle seat 1 of a first embodiment of the present invention, and FIG. 1B is a top view of a partially enlarged seat back 3.

Figure 1B:
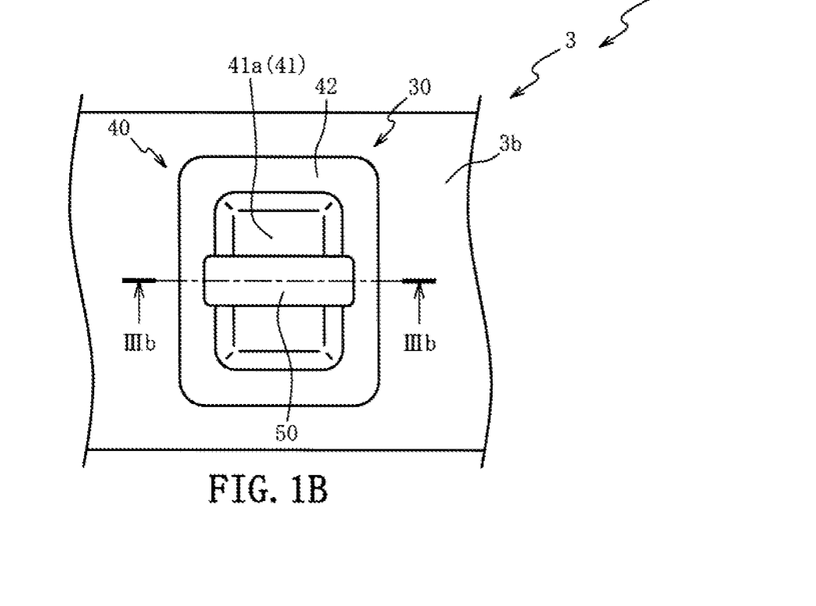
FIG. 1B is a top view of a partially enlarged seat back.

As illustrated in FIG. 1, the vehicle seat 1 is a seat mounted to a vehicle (for example, an automobile and a railway vehicle). The vehicle seat 1 includes a seat cushion 2, which forms a seat surface, the seat back 3, which is coupled to a rear end of the seat cushion 2 to form a backrest, and a head rest 4, which is disposed at an upper end of the seat back 3.

The seat back 3 includes a reclining device (not illustrated) disposed at the lower end side, a fixing mechanism (not illustrated), which fixes a rotation of the seat back 3 around an axis of the reclining device (that is, fixes a posture of the seat back 3), and a releasing unit 30, which releases the fixed state of the seat back 3 by the fixing mechanism.

The releasing unit 30 includes a strap 50 bridged across a cover member 40 and disposed on the top end surface of the seat back 3. Pulling the strap 50 to the upper side (the near-side in a direction vertical to the paper of FIG. 1B) of the seat back 3 or pushing the strap 50 into the lower side (the far-side in the direction vertical to the paper of FIG. 1B) of the seat back 3 releases the fixation of the posture of the seat back 3 by the fixing mechanism.

Figure 2:
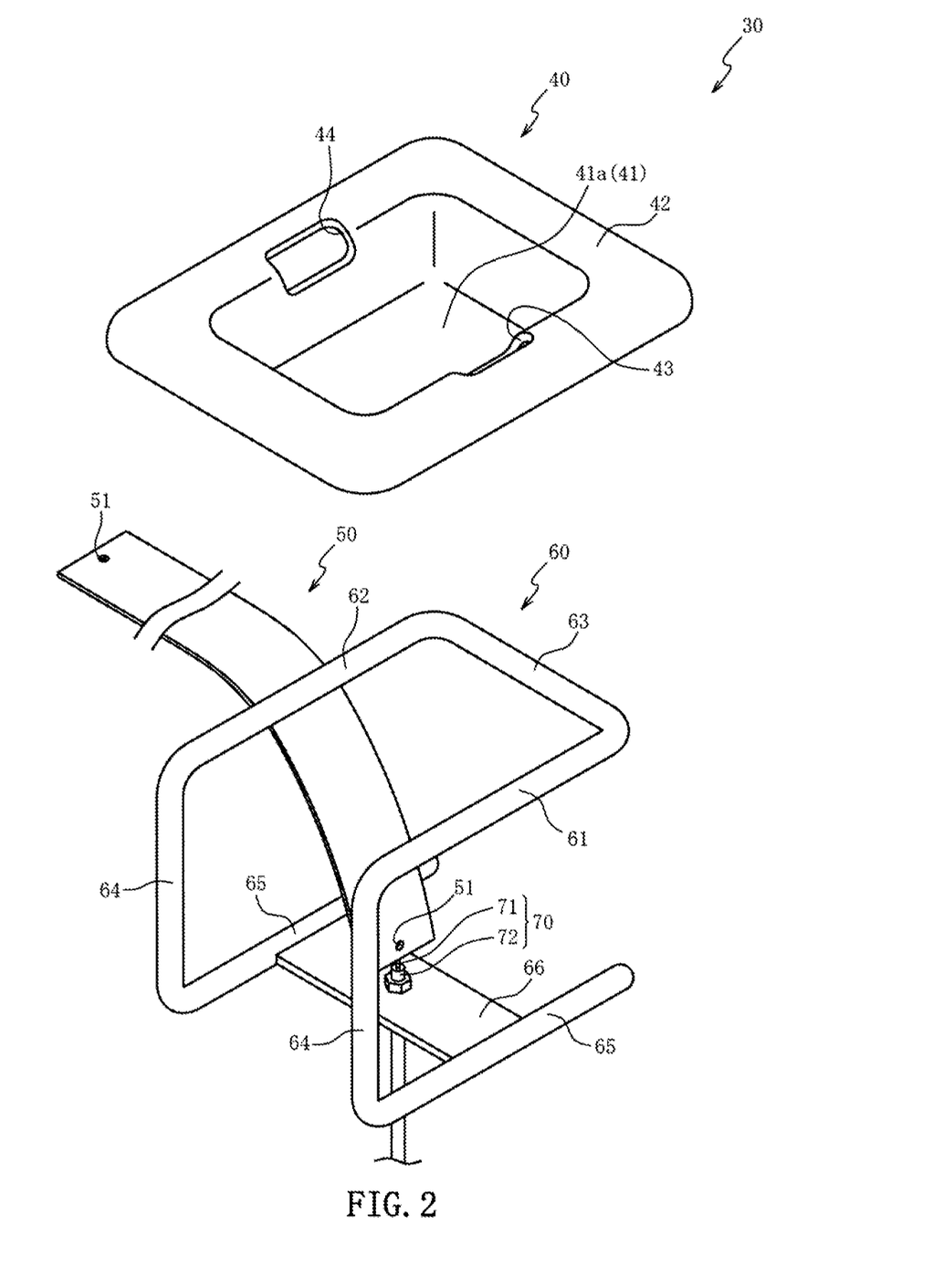
FIG. 2 is an exploded perspective view of a releasing unit.
Figure 3A:
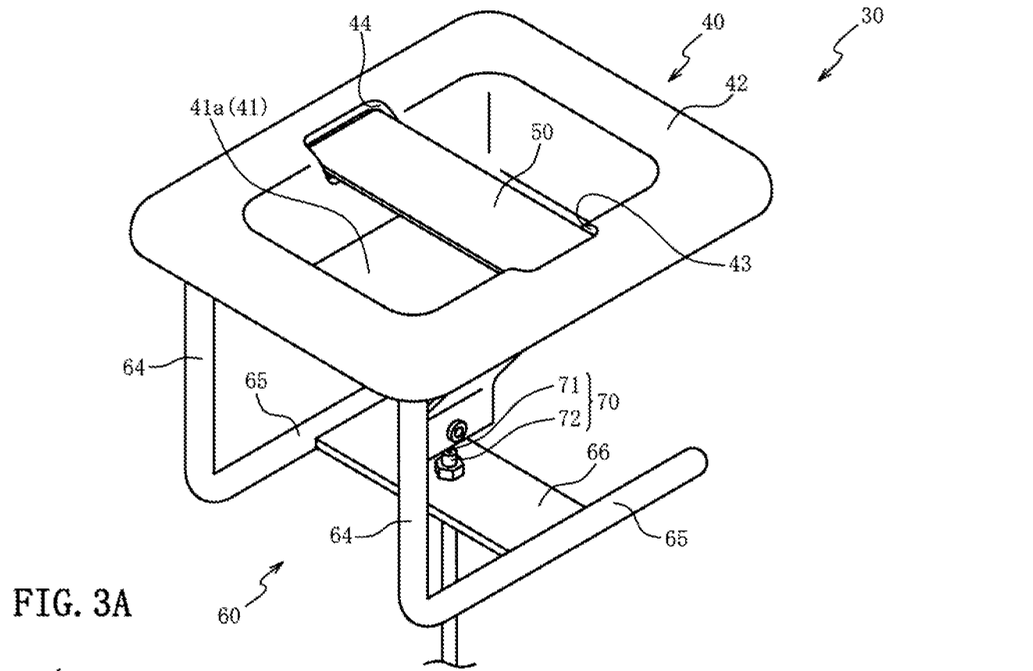
FIG. 3A is a perspective view of the releasing unit.
Figure 3B:
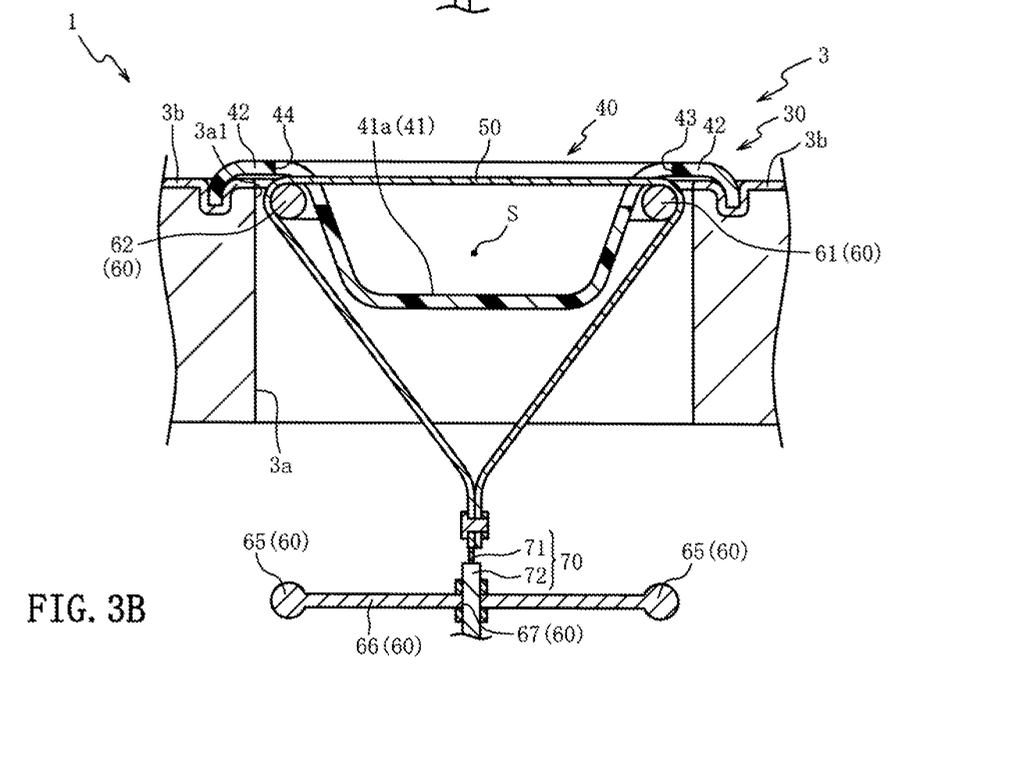
FIG. 3B is a cross-sectional view of the seat back taken along a line IIIb-IIIb in FIG. 1B.

The following describes a detailed configuration of the releasing unit 30 with reference to FIG. 2 and FIG. 3. FIG. 2 is an exploded perspective view of the releasing unit 30. FIG. 3A is a perspective view of the releasing unit 30, and FIG. 3B is a cross-sectional view of the seat back 3 taken along a line IIIb-IIIb in FIG. 1B. For simplification of the drawings, FIG. 2 and FIG. 3 illustrate a simplified coupling portion of the strap 50 to a wire cable 71. The same applies to FIG. 4 to FIG. 6.

As illustrated in FIG. 2 and FIG. 3, the releasing unit 30 includes the cover member 40, which coats a recess 3a on the seat back 3, the strap 50, which is inserted through a first insertion hole 43 and a second insertion hole 44 of the cover member 40, a supporting member 60, which supports the strap 50, and a drawing member 70 having a distal end fixed to the supporting member 60 and to which the base end of the strap 50 is coupled.

The cover member 40 includes a depressed portion 41, a protruding portion 42, the first insertion hole 43, and the second insertion hole 44. The depressed portion 41 is depressed into an approximately truncated square pyramid shape to the inner side (the lower side in FIG. 3B) of the seat back 3. The protruding portion 42 projects out from the outer edge of the depressed portion 41 to four sides. The first insertion hole 43 and the second insertion hole 44 are formed so as to open at parts where the depressed portion 41 is continuous with the protruding portion 42.

The depressed portion 41 has a dimension in a width direction (a direction perpendicular to a longitudinal direction of the strap 50, the direction vertical to the paper of FIG. 3B) of the strap 50 set longer than a width dimension of the strap 50. A bottom surface 41a of the depressed portion 41 is disposed opposed to the strap 50 in the state bridged between a first supporting portion 61 and a second supporting portion 62. A space S is formed between the bottom surface 41a and the strap 50.

The protruding portion 42 is formed projecting out from the outer edge of the depressed portion 41 into an approximately square shape in the top view. The distal end sides in the projecting direction are formed to be bent downward (the inner side of the seat back 3, the lower side in FIG. 3B). The first insertion hole 43 and the second insertion hole 44 are disposed opposed along an extension direction of the strap 50 (the site bridged between the first supporting portion 61 and the second supporting portion 62). The strap 50 is inserted through these first insertion hole 43 and second insertion hole 44.

The strap 50 is made of a fabric, a synthetic leather, a leather, or a similar material and formed into a strip shape. The strap 50 includes two pieces of through-holes 51 formed to pass through on both end sides of the strap 50 in the longitudinal direction. The distal end (one end) and the base end (the other end) of the strap 50 are fixed via two pieces of these through-holes 51 with crimps (rivets). Accordingly, the strap 50 is formed into an endless shape (the strap 50 is entirely formed into a loop shape).

The supporting member 60 is made of a metallic material and is joined to a metallic frame (not illustrated) forming a frame of the seat back 3. The supporting member 60 includes the pair of first supporting portion 61 and second supporting portion 62, a joining portion 63 (see FIG. 2), a pair of continuous portions 64, a pair of bent portions 65, a holding portion 66, and a through-hole 67 (see FIG. 3B). The first supporting portion 61 and the second supporting portion 62 are disposed opposed in a right-left direction of the seat back 3 at a predetermined interval. The joining portion 63 couples end portions on one sides of the pair of first supporting portion 61 and second supporting portion 62 in the longitudinal direction. The pair of continuous portions 64 are continuous with end portions on the other sides of the respective first supporting portion 61 and second supporting portion 62 in the longitudinal direction and disposed to extend to the inner side of the seat back 3. The pair of bent portions 65 are bent from lower ends of the continuous portions 64 to the one side. The holding portion 66 is disposed between the pair of opposed bent portions 65. The through-hole 67 is formed passing through the holding portion 66. The supporting member 60 is formed into a shape opening at the one side (the side where the joining portion 63 is formed) in side view.

The first supporting portion 61, the second supporting portion 62, the joining portion 63, the continuous portion 64, and the bent portion 65 are each formed into a columnar shape. The respective first supporting portion 61 and second supporting portion 62 are disposed to extend along a front-rear direction of the seat back 3. With the protruding portion 42 supported by these first supporting portion 61, second supporting portion 62, and joining portion 63, the cover member 40 is bonded to the supporting member 60.

While inserted through the first insertion hole 43 and the second insertion hole 44, the strap 50 is wound around the first supporting portion 61 and the second supporting portion 62. Thus, the base end and the distal end of the strap 50 are fixed, forming the endless shape. The site of the strap 50 bridged between the first supporting portion 61 and the second supporting portion 62 is inserted through the respective first insertion hole 43 and second insertion hole 44. Accordingly, even if the bonding between the cover member 40 and the supporting member 60 peels off, the strap 50 can restrict a coming off of the cover member 40 from the supporting member 60.

The pair of bent portions 65 are disposed to extend parallel to the first supporting portion 61 and the second supporting portion 62. The flat plate-shaped holding portion 66 is disposed at the center part of the pair of bent portions 65 in the extension direction. The through-hole 67 is formed at the center part of the holding portion 66 in a direction that the first supporting portion 61 is opposed to the second supporting portion 62. The through-hole 67 is formed as a hole passing through along an upper-lower direction of the seat back 3, and the distal end of the drawing member 70 is fixed to the through-hole 67.

The drawing member 70 includes the wire cable 71, which releases the fixation by the fixing mechanism, and an outer member 72, which coats the wire cable 71. The wire cable 71 is a metallic wire to draw a member (for example, a lever) releasing the fixation by the fixing mechanism. The base end of the wire cable 71 is coupled to the fixing mechanism.

The site on the distal end side of the outer member 72 is inserted through the through-hole 67. Screwing a pair of nuts with male screws (not illustrated) formed on an outer periphery of the outer member 72 fixes the outer member 72 to the holding portion 66.

As illustrated in FIG. 3B, the seat back 3 has the recess 3*a*. The recess 3*a* is a space communicating between the inside and the outside of the seat back 3. A through-hole is formed on a skin 3*b* of the seat back 3 with an opening dimension approximately identical to an opening 3*a*1 of the recess 3*a*. The releasing unit 30 is disposed with an aspect where the releasing unit 30 coats these opening 3*a*1 of the recess 3*a* and through-hole on the skin 3*b*.

That is, when the supporting member 60 is fixed to the cover member 40, the outer edge of the protruding portion 42 of the cover member 40 presses the terminal (the edge of the skin 3*b* on the through-hole side) of the skin 3*b* to a cushion member (a cushion pad supported by the frame of the seat back 3) of the seat back 3 (the terminal of the skin 3*b* bites the cushion member to the lower side in FIG. 3B). Accordingly, while the cover member 40 coats the opening 3*a*1 and the through-hole on the skin 3*b*, the terminal of the skin 3*b* is fixed by the protruding portion 42 of the cover member 40. Accordingly, a seated person can be less likely to visually perceive the opening 3*a*1 and the through-hole on the skin 3*b*, and further an exposure of the terminal of the skin 3*b* can be reduced, improving in appearance of the vehicle seat 1. Additionally, the cover member 40 can restrict an entrance of a foreign matter from the opening 3*a*1.

The first supporting portion 61 and the second supporting portion 62 are disposed such that the upper ends go along the edge of the opening 3*a*1 of the recess 3*a*. The depressed portion 41 of the cover member 40 is disposed in an aspect of fitting to the recess 3*a*.

Figure 4A:
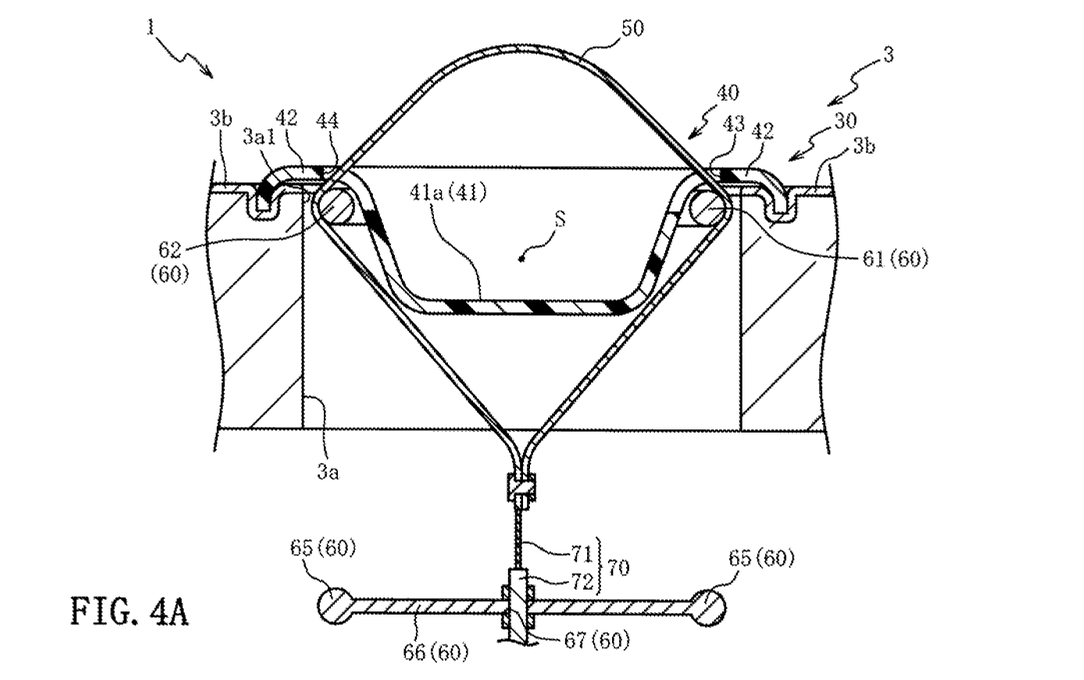
FIG. 4A is a cross-sectional view of the seat back illustrating a state of being manipulated in a direction that a strap separates from a recess from the state in FIG. 3B.
Figure 4B:
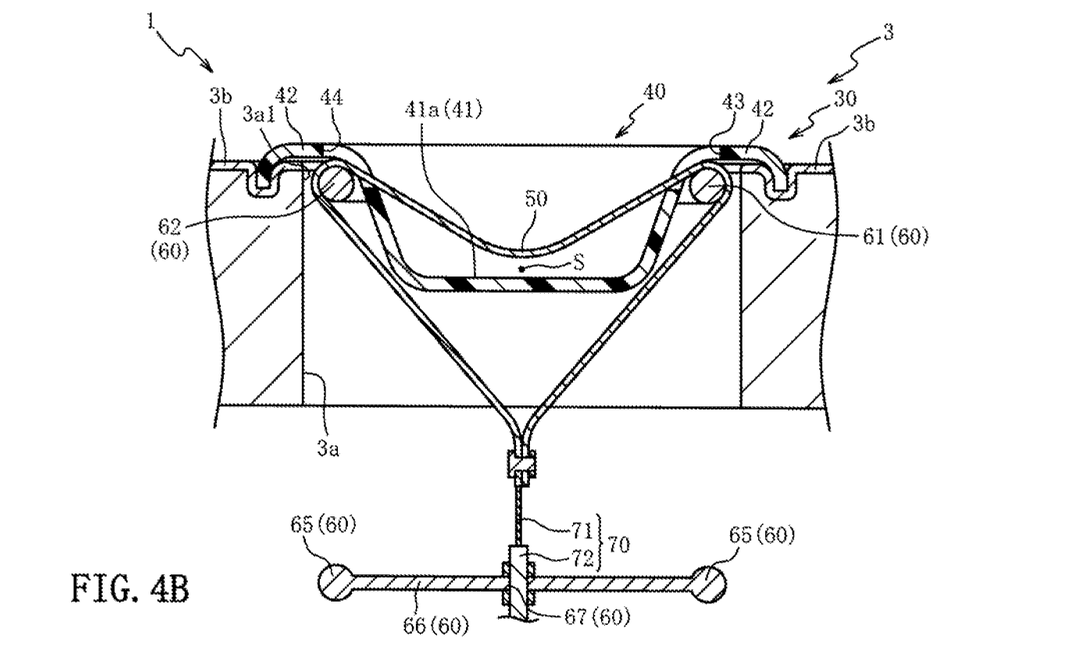
FIG. 4B is a cross-sectional view of the seat back illustrating a state of being manipulated in a direction that the strap enters into the recess from the state in FIG. 3B.

The following describes behaviors of the releasing unit 30 with reference to FIG. 4. FIG. 4A is a cross-sectional view of the seat back 3 illustrating a state that the strap 50 in the state of FIG. 3B is manipulated in a direction separating from the recess 3*a*. FIG. 4B is a cross-sectional view of the seat back 3 illustrating a state that the strap 50 in the state of FIG. 3B is manipulated in a direction entering into the recess 3*a*. FIG. 4 schematically illustrates the cross-sectional surface of the seat back 3.

As illustrated in FIG. 4, when the strap 50 (the part bridged between the first supporting portion 61 and the second supporting portion 62) is manipulated in the direction separating from the recess 3*a* or the direction entering into the recess 3*a* (that is, the strap 50 is pulled from the space S side to the outside of the seat back 3 or is pushed into the space S side), the strap 50 (the part positioned between the first supporting portion 61, the second supporting portion 62, and the wire cable 71) is pulled out from the first insertion hole 43 and the second insertion hole 44. Thus, the wire cable 71 is drawn.

That is, since the space S is formed underneath the strap 50 bridged between the first supporting portion 61 and the second supporting portion 62, passing a finger in the space S ensures easily pulling the strap 50. Since the wire cable 71 can be drawn not only by the manipulation of pulling the strap 50 but also by the manipulation of pushing the strap 50 into the space S side, the operability of the strap 50 is improved.

Further, the manipulation of pushing the strap 50 into the space S side ensures drawing the wire cable 71; therefore, the releasing unit 30 can be disposed at a region where a space to pull out the strap 50 cannot be secured. Since the first supporting portion 61 and the second supporting portion 62 are formed into the columnar shape, the strap 50 is smoothly slidable with respect to the first supporting portion 61 and the second supporting portion 62.

Here, for example, it is also possible to integrally form the cover member and the supporting member from a resin material and a metallic material. In this case, since a load caused by the manipulation of the strap 50 is applied to the first supporting portion, the second supporting portion, the holding portion, or the joining portion of the supporting member and the frame, the cover member and the supporting member need to have a predetermined rigidity. Accordingly, integrally forming the cover member and the supporting member requires enhancing the rigidity at the site equivalent to the cover member as well; therefore, when the seated person contacts the site, the seated person probably feels uncomfortable.

In contrast to this, with the vehicle seat 1 of the embodiment, the cover member 40 and the supporting member 60 are separately formed. The supporting member 60 is made of the metallic material, and the strap 50 is bridged across the supporting member 60. That is, since the high-rigidity supporting member 60 receives the load caused by the manipulation of the strap 50, the cover member 40 can be made of a highly flexible resin material. Accordingly, even if the seated person contacts the cover member 40, this vehicle seat 1 can reduce the uncomfortable feeling felt by the seated person.

For example, with a configuration where one end of the strap is coupled to the first supporting portion 61 and the other end of the strap coupled to the first supporting portion 61 is bridged across the second supporting portion 62 and also is coupled to the distal end of the wire cable 71, it is also possible to draw the wire cable 71 by the manipulation of pulling the strap and by the manipulation of pushing the strap into the space S side. However, with such configuration, a tractive force cannot be efficiently transmitted to the wire cable 71 by, for example, a friction force applied between the strap and the finger when the strap is pulled and a reactive force from the first supporting portion 61 by pulling the strap. This problem is addressed by manipulating the strap by picking up the strap by the fingers and manipulating the strap in a direction in which the reactive force from the first supporting portion 61 is less likely to apply; however, this causes a restriction on a method for manipulating the strap.

In contrast to this, the vehicle seat 1 of the embodiment includes the first supporting portion 61 and the second supporting portion 62 on the inner peripheral side of the strap 50 formed into the endless shape. Both ends of the strap 50 (that is, a part of the endless-shaped strap 50 in the circumstantial direction and a site excluding the part bridged between the first supporting portion 61 and the second supporting portion 62) are coupled to the wire cable 71.

Accordingly, by pulling the strap 50 from the space S side and pushing the strap 50 into the space S side, the wire cable 71 is pulled by both the strap 50 positioned between the first supporting portion 61 and the wire cable 71 and the strap 50 positioned between the second supporting portion 62 and the wire cable 71.

Accordingly, for example, compared with the configuration of coupling the one end of the strap to the first supporting portion 61 as described above, this configuration allows reducing the application of the friction force between the strap 50 and the fingers and the application of the reactive force from the first supporting portion 61 when the strap 50 is pulled. This allows efficiently transmitting the tractive force by the manipulation of the strap 50 to the wire cable 71, improving the operability of the strap 50.

With the embodiment, when the strap 50 is manipulated in the direction of being pulled, the first insertion hole 43 and the second insertion hole 44 are formed so as to open with the dimension at which the strap 50 does not contact the cover member 40. That is, the first insertion hole 43 and the second insertion hole 44 are formed so as to open to the upper side (the upper side in FIG. 3B) of the seat back 3, and even if the strap 50 is pulled until at least the fixation by the fixing mechanism is released and the drawing of the wire cable 71 is restricted, the first insertion hole 43 and the second insertion hole 44 are formed with the opening width at which the strap 50 does not contact the cover member 40.

Accordingly, an interference to the cover member 40 by the strap 50 manipulated in the direction of being pulled can be reduced, thereby ensuring reducing a lift of the cover member 40 upward by the manipulation of the strap 50. This ensures reducing the application of the force in the direction of stripping the cover member 40 from the skin 3*b* of the seat back 3.

Figure 5A:
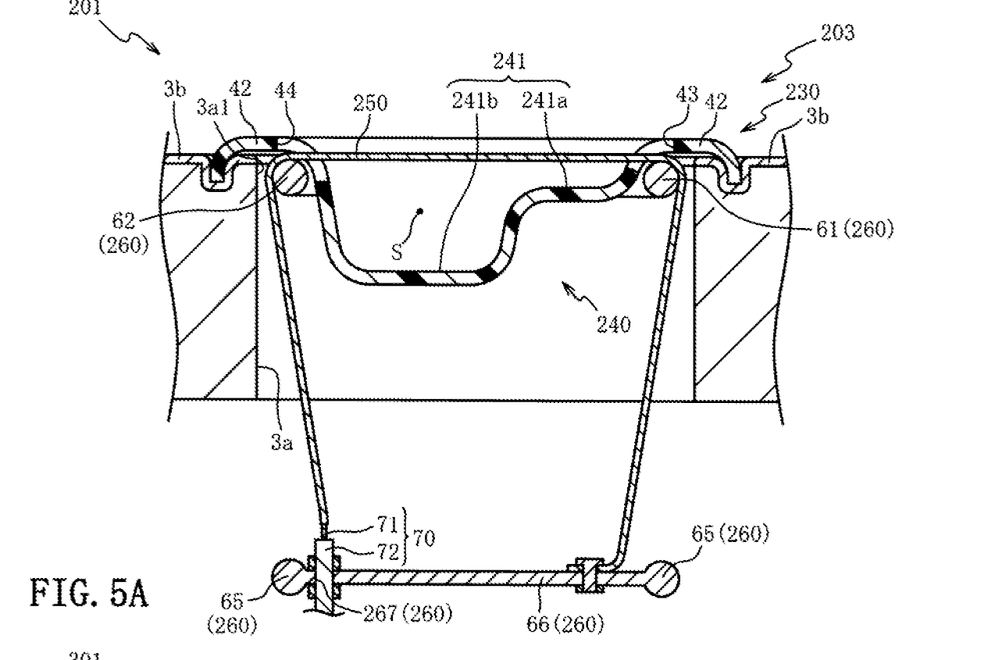
FIG. 5A is a cross-sectional view of the seat back of a second embodiment.

The following describes a second embodiment with reference to FIG. 5A. While the first embodiment describes the case where the one end of the strap 50 is coupled to the other end of the strap 50, the second embodiment couples one end of a strap 250 to the holding portion 66. Like reference numerals designate corresponding or identical elements in the above-described first embodiment and the second embodiment, and therefore such elements will not be further elaborated here.

FIG. 5A is a cross-sectional view of a seat back 203 of the second embodiment. FIG. 5A schematically illustrates a cross-sectional surface of the seat back 203. As illustrated in FIG. 5A, a depressed portion 241 of a cover member 240 includes a first bottom surface 241*a* and a second bottom surface 241*b*. The first bottom surface 241*a* is depressed into an approximately truncated square pyramid shape, and a part of the bottom surface is formed so as to curve into an approximately S shape in the cross-sectional surface. The first bottom surface 241*a* is formed on the first supporting portion 61 side. The second bottom surface 241*b* is configured to have an opposed interval with the strap 250 larger than that of the first bottom surface 241*a* and formed on the second supporting portion 62 side.

Accordingly, since the depressed portion 241 is formed so as to curve into the approximately S shape in the cross-sectional surface, the space below the depressed portion 241 (the inner side of the seat back 203) can be effectively used. That is, even if there is a limitation on the arranging position of a releasing unit 230 by the arrangement and the shape of the respective members such as the frame disposed inside the seat back 203, the respective members can be disposed in the space below the depressed portion 241. This improves the freedom of design inside the seat back 203.

The one end of the strap 250 is coupled to the end portion on the first supporting portion 61 side of the holding portion 66 by crimping. The one end to the other end of the strap 250 is inserted through the first insertion hole 43 and the second insertion hole 44 and are bridged between the first supporting portion 61 and the second supporting portion 62. Thus, the other end is coupled to the wire cable 71.

Accordingly, when the strap 250 (the part bridged between the first supporting portion 61 and the second supporting portion 62) is manipulated in the direction of entering into the recess 3*a* or in the direction of separating from the recess 3*a*, the strap 250 positioned between the second supporting portion 62 and the wire cable 71 is pulled out from the second insertion hole 44 and the wire cable 71 is drawn.

In this case, with the embodiment, a through-hole 267 of a supporting member 260 is formed at a position biased to the second supporting portion 62 side with respect to the center in the opposed direction (the right-left direction in FIG. 5A) of the first supporting portion 61 to the second supporting portion 62 (the end portion on the second supporting portion 62 side of the holding portion 66). That is, the outer member 72 (the wire cable 71) is fixed to the end portion of the holding portion 66 on the second supporting portion 62 side. Accordingly, manipulating the strap 250 ensures drawing the wire cable 71 in the direction along the extension direction of the wire cable 71. This ensures efficiently transmitting the tractive force by the manipulation of the strap 250 to the wire cable 71.

Here, with the configuration where the one end of the strap 250 is coupled to the holding portion 66, compared with manipulating the first supporting portion 61 side part in a strap 250 bridged between the first supporting portion 61 and the second supporting portion 62, manipulating the second supporting portion 62 side part is likely to transmit the tractive force to the wire cable 71.

That is, since the manipulation by pulling the site on the first supporting portion 61 side of the strap 250 or pushing the site applies the reactive force from the first supporting portion 61, the tractive force cannot be efficiently transmitted to the wire cable 71.

In contrast to this, with a vehicle seat 201 according to the embodiment, the opposed interval between the second bottom surface 241*b*, which is formed on the second supporting portion 62 side, with the strap 250 is configured larger than the opposed interval between the first bottom surface 241*a*, which is formed on the first supporting portion 61 side, with the strap 250. Accordingly, since the seated person can manipulate the strap 250, which is on the side close to the second supporting portion 62 compared with the first supporting portion 61, the tractive force by the manipulation of the strap 250 can be efficiently transmitted to the wire cable 71. Accordingly, the operability of the strap 250 is improved.

Figure 5B:
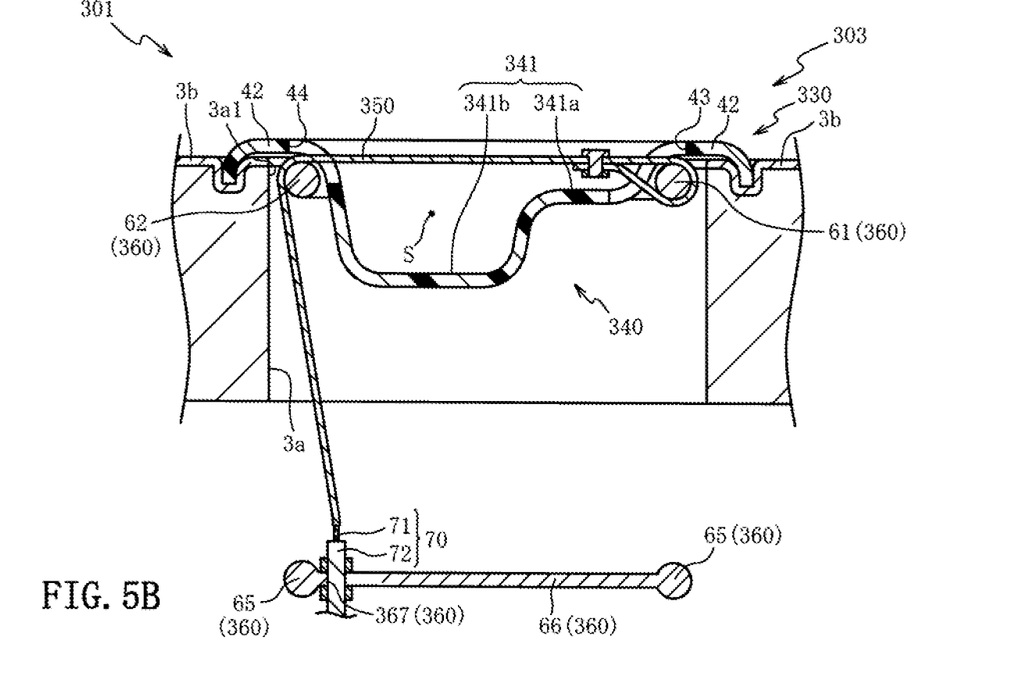
FIG. 5B is a cross-sectional view of a seat back of a third embodiment.

The following describes a third embodiment with reference to FIG. 5B. While the first embodiment describes the case where the one end of the strap 50 is coupled to the other end of the strap 50, the third embodiment couples one end of the strap 350 to a site of the strap 350 bridged between the first supporting portion 61 and the second supporting portion 62. Like reference numerals designate corresponding or identical elements in the above-described respective embodiments and the third embodiment, and therefore such elements will not be further elaborated here.

FIG. 5B is a cross-sectional view of a seat back 303 according to the third embodiment. FIG. 5B schematically illustrates a cross-sectional surface of the seat back 303. As illustrated in FIG. 5B, the one end of the strap 350 is coupled to a site of the strap 350 bridged between the first supporting portion 61 and the second supporting portion 62. This forms the one end side into a loop shape and the first supporting portion 61 is inserted through the loop-shaped site. The strap 350 is bridged across the second supporting portion 62 from the loop-shaped site to the other end side, and the other end is coupled to the wire cable 71.

Accordingly, when the strap 350 (the part bridged between the first supporting portion 61 and the second supporting portion 62) is manipulated in the direction of being pushed or pulled, the strap 350 positioned between the second supporting portion 62 and the wire cable 71 is pulled out from the second insertion hole 44 and the wire cable 71 is drawn.

In this case, since the one end of the strap 350 is coupled to the site (the site on the first supporting portion 61 side) of the strap 350 bridged between the first supporting portion 61 and the second supporting portion 62, a dimension (the overall length) of the strap 350 can be shortened compared with the case where the one end of the strap is coupled to the holding portion 66 and the one end of the strap is coupled to the other end to be formed into the endless shape. Accordingly, a product cost of a vehicle seat 301 can be reduced.

Here, with the configuration where the one end of the strap 350 (the loop formed at the one end) is coupled to the first supporting portion 61, similar to the second embodiment, the manipulation of the second supporting portion 62 side part is likely to transmit the tractive force to the wire cable 71 compared with the manipulation of the first supporting portion 61 side part of the strap 350 bridged between the first supporting portion 61 and the second supporting portion 62.

In contrast to this, with the vehicle seat 301 according to the embodiment, similar to the second embodiment, since the opposed interval between a second bottom surface 341b, which is formed on the second supporting portion 62 side, with the strap 350 is configured larger than the opposed interval between a first bottom surface 341a, which is formed on the first supporting portion 61 side, with the strap 350, the tractive force by the manipulation of the strap 350 can be efficiently transmitted to the wire cable 71.

Figure 6:
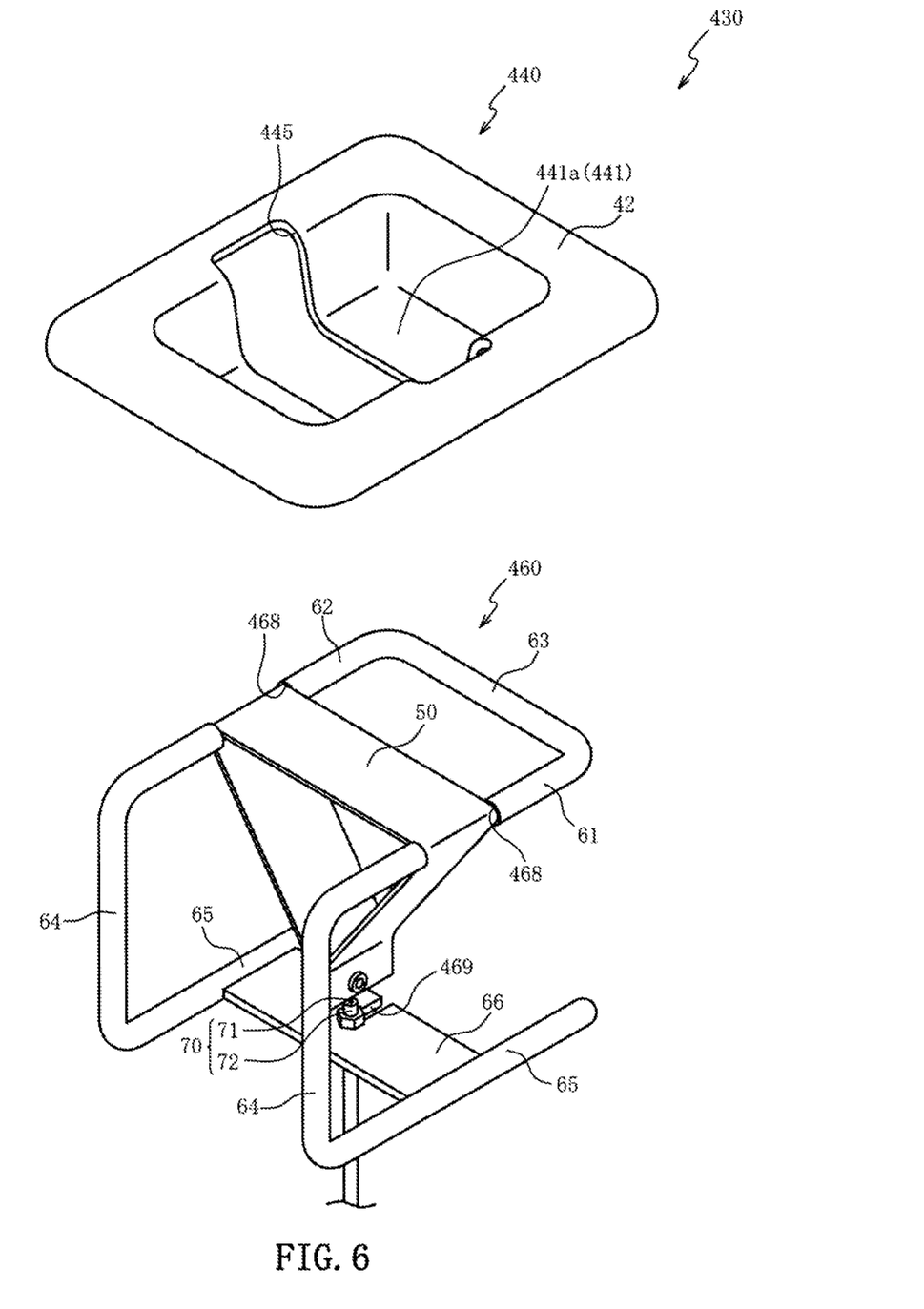
FIG. 6 is an exploded perspective view of a releasing unit of a fourth embodiment.

The following describes a fourth embodiment with reference to FIG. 6. While the first embodiment describes the case where the one end of the strap 50 is coupled to the other end while the one end is inserted through the first insertion hole 43 and the second insertion hole 44, and the strap 50 is bridged across the supporting member 60, the fourth embodiment describes the case where the strap 50 formed into the endless shape is bridged across a supporting member 460. Like reference numerals designate corresponding or identical elements in the above-described respective embodiments and the fourth embodiment, and therefore such elements will not be further elaborated here.

FIG. 6 is an exploded perspective view of a releasing unit 430 of the fourth embodiment. As illustrated in FIG. 6, a cover member 440 includes an insertion hole 445 formed with an aspect where the first insertion hole 43 and the second insertion hole 44 according to the first embodiment are coupled.

The insertion hole 445 is formed across both ends of a depressed portion 441 along the extension direction of the strap 50. When the cover member 440 is supported to the supporting member 460 where the strap 50 is bridged, the insertion hole 445 is formed with a width dimension with which the cover member 440 does not interfere with the strap 50.

The supporting member 460 includes reduced diameter portions 468 where outer diameters of the first supporting portion 61 and the second supporting portion 62 decrease. The reduced diameter portions 468 are formed at the center parts of the first supporting portion 61 and the second supporting portion 62 in the extension direction, and the width dimensions (the dimensions of the first supporting portion 61 and the second supporting portion 62 in the extension direction) are formed to be identical to (or slightly longer than) the width dimension of the strap 50.

The holding portion 66 includes a communication passage 469 to communicate between the end portion on the joining portion 63 side of the holding portion 66 and the through-hole 67. The communication passage 469 is formed from an outer edge on one side of the holding portion 66 along the extension direction of the first supporting portion 61 and the second supporting portion 62, and the width dimension of the communication passage 469 is formed with a dimension with which the outer member 72 is insertable.

This allows the outer member 72 to be inserted through the communication passage 469 and disposed at the through-hole 67. Here, with a configuration where the communication passage 469 is not formed, to hold the outer member 72 to the holding portion 66, it is necessary to couple the strap 50 to the wire cable 71 or couple the wire cable 71 to a fixing mechanism after the one end or the other end of the outer member 72 (the drawing member 70) is inserted through the through-hole 67. This deteriorates the working efficiency of work to hold the outer member 72 to the holding portion 66.

In contrast to this, since the embodiment can insert the outer member 72 through the communication passage 469 to dispose the outer member 72 at the through-hole 67, the outer member 72 can be held to the holding portion 66 with the strap 50 coupled to the wire cable 71. This improves the working efficiency of work to hold the outer member 72 to the holding portion 66.

Since the one sides (the sides to which the joining portion 63 is joined) of the first supporting portion 61 and the second supporting portion 62 are formed so as to open and the cover member 440 includes the insertion hole 445, the endless-shaped strap 50 (the strap 50 is kept to be the endless shape without disconnecting the one end and the other end) can be bridged across the supporting member 460. This improves the working efficiency of work to cause the strap 50 to be bridged across the supporting member 460.

In this case, since the one sides of the first supporting portion 61 and the second supporting portion 62 are formed so as to open and the communication passage 469 couples the through-hole 67 and the outer edge on the one side of the holding portion 66 (that is, the one side of the communication passage 469 opens) to be formed, the strap 50 and the outer member 72 can be mounted to the supporting member 460 and the through-hole 67 from the identical direction. This improves the working efficiency of both work to cause the endless-shaped strap 50 to be bridged across the supporting member 460 and work to hold the outer member 72 to the holding portion 66.

The first supporting portion 61 and the second supporting portion 62 include the reduced diameter portions 468 where the outer diameters decrease; therefore, the outer member 72 can be mounted (a nut is screwed) to the holding portion 66 while the strap 50 is engaged with the reduced diameter portions 468. This improves the working efficiency of work to hold the outer member 72 to the holding portion 66.

As described above, the present invention has been described based on the above-mentioned embodiments. It can be easily inferred that the present invention will not be limited to the embodiments described above, but various modifications and improvements are possible without departing from the gist of the present invention.

While the respective embodiments exemplify the seat backs 3, 203, and 303 as the movable members where the releasing units 30, 230, 330, and 430 are disposed, the configuration is not necessarily limited to this. As long as the member performs the predetermined behavior, for example, a head rest, an arm rest, an ottoman, or a seat cushion (for example, the member that rotates around the axis on rear end side of the seat cushion and is formed so as to be foldable), the configurations of the releasing units 30, 230, 330, and 430 of the embodiments are applicable.

The behavior of the movable member is not limited to the turning around the axis such as the reclining device, and the behavior may be the rotation of the movable member itself (for example, a change in a seated direction of the vehicle seat) or may be a sliding or a folding behavior. That is, as long as the fixing mechanism to release the fixed state of the predetermined behavior is provided, all the technical ideas of the present invention are applicable.

In this case, the behavior direction of the movable member is preferably configured to be a direction identical to the manipulation direction (the direction of pulling or the direction of pushing the manipulating member) of the manipulating member of the releasing unit. That is, since the releasing unit can release the fixing mechanism by the manipulation in the direction of entering into the recess of the movable member or in the direction of separating from the recess, for example, by disposing the releasing unit at the back surface of the seat back ensures inclining the seat back forward while pushing the manipulating member into the recess and inclining the seat back rearward while pulling the manipulating member from the recess. That is, matching the behavior direction of the movable member with the manipulation direction of the manipulating member of the releasing unit ensures performing the predetermined behavior of the movable member and the manipulation of the manipulating member simultaneously.

While the respective embodiments describe the case where the cover member 40 and the supporting member 60 are separately formed, the configuration is not necessarily limited to this, and the cover member 40 and the supporting member 60 may be integrally formed.

While the respective embodiments describe the case where the first supporting portion 61, the second supporting portion 62, and the holding portion 66 are integrally formed, the configuration is not necessarily limited to this. For example, the first supporting portion 61, the second supporting portion 62, and the holding portion 66 may be separately formed and may be each individually joined to the frame.

While the respective embodiments exemplify the strip-shaped straps 50, 250, and 350 as one example of the manipulating member, the manipulating member is not necessarily limited to these but may be, for example, string-like and chain-like members.

While the respective embodiments omit the explanation on the method for coupling the straps 50, 250, and 350 to the wire cable 71, as the method for coupling the strap to the wire cable, for example, a configuration where the wire cable is inserted through a through-hole of an aluminum sleeve fixedly secured to the strap and the aluminum sleeve is crimped (squashed) for coupling is exemplified.

While the first embodiment describes the case where the depressed portion 41 and the protruding portion 42 are integrally formed, the configuration is not necessarily limited to this. For example, the depressed portion may be formed separately from the protruding portion. Accordingly, since the endless strap 50 can be bridged across the supporting member 60 with the depressed portion supported to the supporting member 60, working efficiency of work to cause the endless-shaped strap 50 to be bridged across the supporting member 60 is improved.

In this case, it is only necessary that the strap 50 is bridged across the supporting member 60 and then the protruding portion is bonded to the depressed portion together. A method for joining the protruding portion to the depressed portion together is not limited to the bonding, but elastic claws fittable to the respective protruding portion and depressed portion may be disposed and the protruding portion and the depressed portion may be screwed for joining.

While the first embodiment describes the case where the cover member 40 and the supporting member 60 are joined by bonding, the joining is not necessarily limited to this. For example, elastic claws fittable to the respective cover member and supporting member may be disposed and the cover member and the supporting member may be screwed for joining.

While the first embodiment describes the case where the through-hole is formed on the skin 3b of the seat back 3 with the opening dimension approximately identical to the opening 3a1 of the recess 3a, the formation is not necessarily limited to this. The through-hole on the skin 3b is preferably formed with the opening dimension at least smaller than (falls within a region surrounded by the outer edge of the protruding portion 42) the outer edge of the protruding portion 42 of the cover member 40. This ensures fixing the terminal of the skin 3b by the protruding portion 42.

While the fourth embodiment describes the case where the reduced diameter portions 468 are formed at the first supporting portion 61 and the second supporting portion 62, the formation is not necessarily limited to this. For example, a configuration where depressed portions are disposed at the top surface or the side surface of the first supporting portion 61 and the second supporting portion 62 may be employed. Thus, the strap 50 can be positioned at the depressed portions.

While the fourth embodiment describes the case where the communication passage 469 is formed so as to couple the through-hole 67 and the outer edge on the one side of the holding portion 66, the configuration is not necessarily limited to this. For example, the communication passage may be configured so as to couple the through-hole 67 to the outer edge on the other side (the side on which the continuous portion 64 is formed) of the holding portion 66. In this case as well, since the outer member 72 can be inserted from the communication passage, this improves the working efficiency of work to hold the outer member 72 to the holding portion 66.

A part of or all the vehicle seats of the respective embodiments may be combined with a part of or all the vehicle seat according to another embodiment to configure a vehicle seat. For example, the reduced diameter portions and the communication passage according to the fourth embodiment may be disposed at the vehicle seats according to the first embodiment to the third embodiment.

The invention claimed is:
1. A vehicle seat comprising:
a movable member that ensures a predetermined behavior;
a fixing mechanism to fix the behavior of the movable member;
a wire cable that has one end coupled to the fixing mechanism;
a manipulating member coupled to another end of the wire cable, the manipulating member being disposed on an outer surface side of the movable member, the manipulating member being manipulated and the wire cable being drawn to release fixation of the movable member by the fixing mechanism; and
a first supporting member and a second supporting member disposed at a predetermined interval, the manipulating member being bridged between the first supporting member and the second supporting member, wherein the movable member has a recess, the recess forming a space with a part of the manipulating member bridged between the first supporting member and the second supporting member, wherein the part of the manipulating member bridged between the first supporting member and the second supporting member is configured to be manipulated both (i) in a direction entering into the recess such that the wire cable is drawn, and (ii) in a direction separating from the recess such that the wire cable is drawn, and wherein the recess has a size such that when the manipulating member is operated in a direction entering the recess, the wire cable is pulled by such operation and fixing by the fixing mechanism is released.

2. The vehicle seat according to claim 1, further comprising a cover member that coats an opening of the recess.

3. The vehicle seat according to claim 2, wherein:
the cover member includes:
   a first insertion hole formed as a hole positioned on a first supporting member side; and
   a second insertion hole formed as a hole positioned on a second supporting member side, and
the part of the manipulating member bridged between the first supporting member and the second supporting member is inserted through the respective first insertion hole and second insertion hole.

4. The vehicle seat according to claim 1, wherein:
the manipulating member is formed into an endless shape, and
the first supporting member and the second supporting member are disposed on an inner peripheral side of the endless-shaped manipulating member, a part of the manipulating member being coupled to the wire cable.

5. The vehicle seat according to claim 4, further comprising:
an outer member through which the wire cable is inserted; and
a holding member that holds a distal end side of the outer member, wherein
the holding member includes:
   a through-hole through which the outer member is inserted; and
   a communication passage that communicates between the through-hole and an outer edge of the holding member, the communication passage being formed with a width with which the outer member is insertable, and the first supporting member and the second supporting member each have one side formed so as to be open.

6. The vehicle seat according to claim 5, wherein
the communication passage communicates between an outer edge on one side of the holding member and the through-hole along an extension direction of the first supporting member and the second supporting member.

7. The vehicle seat according to claim 2, further comprising:
an outer member through which the wire cable is inserted; and
a holding member that holds a distal end side of the outer member, wherein:
the manipulating member has one end coupled to the first supporting member or the holding member, the manipulating member having another end coupled to another end of the wire cable, the one end to the other end of the manipulating member being bridged between the first supporting member and the second supporting member, and
the holding member holds the distal end side of the outer member at a position biased to the second supporting member side of the holding member in a direction in which the first supporting member is opposed to the second supporting member.

8. The vehicle seat according to claim 7, wherein
the cover member includes:
   a first bottom surface formed on a first supporting member side, the first bottom surface being opposed to the manipulating member; and
   a second bottom surface has an opposed interval with the manipulating member formed larger than an opposed interval of the first bottom surface with the manipulating member, the second bottom surface being formed on a second supporting member side.

9. The vehicle seat according to claim 7, wherein
the one end of the manipulating member is coupled to the first supporting member.

10. The vehicle seat according to claim 3, wherein
when the part of the manipulating member bridged between the first supporting member and the second supporting member is manipulated in the direction separating from the recess, the first insertion hole and the second insertion hole are formed so as to open with a dimension with which the manipulating member becomes contactless.

11. The vehicle seat according to claim 1, wherein the manipulating member is flexible.

* * * * *